US011347388B1

(12) United States Patent
Holland

(10) Patent No.: US 11,347,388 B1
(45) Date of Patent: May 31, 2022

(54) SYSTEMS AND METHODS FOR DIGITAL CONTENT NAVIGATION BASED ON DIRECTIONAL INPUT

(71) Applicant: Meta Platforms, Inc., Menlo Park, CA (US)

(72) Inventor: Jason Holland, Mountain View, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/008,089

(22) Filed: Aug. 31, 2020

(51) Int. Cl.
*G06F 3/0485* (2022.01)
*G06F 3/04883* (2022.01)
*G06F 3/0482* (2013.01)

(52) U.S. Cl.
CPC .......... *G06F 3/0485* (2013.01); *G06F 3/0482* (2013.01); *G06F 3/04883* (2013.01)

(58) Field of Classification Search
CPC ... G06F 3/0485; G06F 3/0482; G06F 3/04883
See application file for complete search history.

(56) References Cited

U.S. PATENT DOCUMENTS

| | | | |
|---|---|---|---|
| D599,366 S | 9/2009 | Brown et al. | |
| D599,368 S | 9/2009 | Kanga et al. | |
| D608,365 S | 1/2010 | Walsh et al. | |
| D614,643 S | 4/2010 | Viegers et al. | |
| D648,735 S | 11/2011 | Arnold et al. | |
| D651,608 S | 1/2012 | Mien et al. | |
| D664,561 S | 7/2012 | Gleasman et al. | |
| D664,988 S | 8/2012 | Gleasman et al. | |
| D692,456 S | 10/2013 | Brinda et al. | |
| D692,915 S | 11/2013 | Brinda et al. | |
| D699,744 S | 2/2014 | Ho Kushner et al. | |
| 8,645,463 B2 | 2/2014 | Knight et al. | |
| D701,227 S | 3/2014 | Lee | |
| D716,339 S | 10/2014 | Lee | |

(Continued)

FOREIGN PATENT DOCUMENTS

WO 2015/149375 A1 10/2015

OTHER PUBLICATIONS

Peyton, "PS3 Tutorial: Game Menu", published: Jul. 29, 2012, https://www.youtube.com/watch?v=j3O_ViiptsA (Year: 2012).*

(Continued)

*Primary Examiner* — Seth A Silverman
(74) *Attorney, Agent, or Firm* — FisherBroyles, LLP

(57) ABSTRACT

A computer-implemented method for digital content navigation based on directional input may include (i) maintaining a user content pod for each user account within a group of user accounts maintained by a social networking platform, (ii) generating a cover card for each user content pod, and (iii) providing, within a graphical user interface for interacting with posts made to the social networking platform, a scrollable display of vertically arranged selectable cover cards configured to (1) scroll vertically between cover cards of different user content pods in response to receiving vertical swiping input and (2) scroll horizontally between one or more posts of an individual user content pod in response to receiving horizontal swiping input. Various other methods, systems, and computer-readable media are also disclosed.

20 Claims, 9 Drawing Sheets

(56) References Cited

U.S. PATENT DOCUMENTS

| | | |
|---|---|---|
| D730,383 S | 5/2015 | Brinda et al. |
| D730,386 S | 5/2015 | Ryan et al. |
| D736,247 S | 8/2015 | Chen et al. |
| D736,248 S | 8/2015 | Chen et al. |
| D746,866 S | 1/2016 | Memoria et al. |
| D753,709 S | 4/2016 | Kawanabe |
| D755,239 S | 5/2016 | Lee et al. |
| D755,814 S | 5/2016 | Rad et al. |
| D757,086 S | 5/2016 | Kang |
| D759,666 S | 6/2016 | Kuhn et al. |
| D762,671 S | 8/2016 | Chan et al. |
| D765,101 S | 8/2016 | Park et al. |
| D766,308 S | 9/2016 | Park et al. |
| D769,295 S | 10/2016 | Han et al. |
| D769,306 S | 10/2016 | Bowen et al. |
| D781,328 S | 3/2017 | Fong et al. |
| D785,028 S | 4/2017 | Federighi et al. |
| D785,643 S | 5/2017 | Boa et al. |
| D789,396 S | 6/2017 | Ruiz et al. |
| D789,969 S | 6/2017 | Chaudhri et al. |
| D789,983 S | 6/2017 | Kim |
| D794,651 S | 8/2017 | Cavander et al. |
| D798,331 S | 9/2017 | Fong et al. |
| D800,754 S | 10/2017 | De Cock et al. |
| D803,869 S | 11/2017 | Kuhn et al. |
| D806,741 S | 1/2018 | Majernik et al. |
| D807,898 S | 1/2018 | Memoria et al. |
| D808,413 S | 1/2018 | Wu et al. |
| D809,003 S | 1/2018 | Sowden et al. |
| D815,130 S | 4/2018 | Phillips et al. |
| D815,666 S | 4/2018 | Burns |
| D816,110 S | 4/2018 | Choi et al. |
| D816,701 S | 5/2018 | Ball et al. |
| D817,972 S | 5/2018 | Karunamuni et al. |
| 9,998,796 B1 | 6/2018 | Kedenburg, III et al. |
| 10,009,308 B2 | 6/2018 | Brunn et al. |
| D824,944 S | 8/2018 | Sagrillo et al. |
| D825,594 S | 8/2018 | Wu et al. |
| D831,059 S | 10/2018 | Bao |
| D832,876 S | 11/2018 | Chung et al. |
| D834,602 S | 11/2018 | Bao |
| D836,118 S | 12/2018 | Patel |
| D836,121 S | 12/2018 | Leong et al. |
| D842,867 S | 3/2019 | Jedrzejowicz et al. |
| D845,324 S | 4/2019 | Hemsley et al. |
| D847,855 S | 5/2019 | Majernik et al. |
| D853,431 S | 7/2019 | Sagrillo et al. |
| D854,031 S | 7/2019 | Alvarez et al. |
| D858,552 S | 9/2019 | Westerhold et al. |
| D859,446 S | 9/2019 | Westerhold et al. |
| D859,450 S | 9/2019 | Krishna |
| D860,227 S | 9/2019 | Fung et al. |
| D860,233 S | 9/2019 | Chaudhri et al. |
| D862,501 S | 10/2019 | Patel |
| D863,324 S | 10/2019 | Kang et al. |
| D868,804 S | 12/2019 | Bragdon |
| D870,141 S | 12/2019 | Bowden et al. |
| D877,762 S | 3/2020 | Feng et al. |
| D879,127 S | 3/2020 | Feng et al. |
| D879,829 S | 3/2020 | Amini et al. |
| D881,219 S | 4/2020 | Ngo et al. |
| D881,220 S | 4/2020 | Feng et al. |
| D882,593 S | 4/2020 | Fatnani et al. |
| D882,608 S | 4/2020 | Murphy et al. |
| D882,609 S | 4/2020 | Murphy et al. |
| D882,612 S | 4/2020 | Antilion et al. |
| D882,613 S | 4/2020 | Zumbrunnen et al. |
| 10,623,917 B1 | 4/2020 | Paul |
| D885,410 S | 5/2020 | Butler |
| D885,421 S | 5/2020 | Lunaparra et al. |
| D886,128 S | 6/2020 | Fatnani et al. |
| D887,428 S | 6/2020 | Fatnani et al. |
| D890,198 S | 7/2020 | Paul |
| D890,204 S | 7/2020 | Bussière et al. |
| D894,206 S | 8/2020 | Naruns et al. |
| D895,664 S | 9/2020 | Baber et al. |
| D900,833 S | 11/2020 | Alonso Ruiz et al. |
| D900,845 S | 11/2020 | Tomori |
| D904,426 S | 12/2020 | Paul |
| D904,431 S | 12/2020 | Park et al. |
| D904,432 S | 12/2020 | Park et al. |
| D905,095 S | 12/2020 | Park et al. |
| 10,852,915 B1 | 12/2020 | Behzadi et al. |
| 10,868,788 B1 | 12/2020 | Underwood et al. |
| D910,054 S | 2/2021 | Silfver et al. |
| D910,064 S | 2/2021 | Paul |
| D912,075 S | 3/2021 | Sharp et al. |
| D913,304 S | 3/2021 | VanDuyn et al. |
| D913,306 S | 3/2021 | Davern et al. |
| D913,314 S | 3/2021 | Paul |
| D914,726 S | 3/2021 | Gouliard et al. |
| D914,741 S | 3/2021 | Anzures et al. |
| D915,440 S | 4/2021 | Kim et al. |
| D916,884 S | 4/2021 | Dascola et al. |
| 10,977,297 B1 * | 4/2021 | Tang .................. G06F 16/4393 |
| 2004/0021673 A1 * | 2/2004 | Alessi .................. G06F 3/0481 |
| | | 345/619 |
| 2008/0034307 A1 | 2/2008 | Cisler et al. |
| 2009/0148124 A1 | 6/2009 | Athsani et al. |
| 2009/0177754 A1 | 7/2009 | Brezina et al. |
| 2009/0216859 A1 | 8/2009 | Dolling |
| 2009/0313578 A1 | 12/2009 | Roh et al. |
| 2009/0327939 A1 | 12/2009 | Johns et al. |
| 2010/0211872 A1 | 8/2010 | Rolston et al. |
| 2010/0231533 A1 | 9/2010 | Chaudhri |
| 2011/0010182 A1 | 1/2011 | Turski et al. |
| 2011/0010659 A1 * | 1/2011 | Kim .................. G06F 3/04883 |
| | | 715/784 |
| 2011/0016417 A1 | 1/2011 | Shiplacoff et al. |
| 2011/0252381 A1 | 10/2011 | Chaudhri |
| 2011/0271328 A1 | 11/2011 | Sutton-Shearer |
| 2011/0283304 A1 | 11/2011 | Roberts et al. |
| 2011/0289067 A1 * | 11/2011 | Jordan ................. G06F 16/3323 |
| | | 707/707 |
| 2012/0005224 A1 | 1/2012 | Ahrens et al. |
| 2012/0089950 A1 | 4/2012 | Tseng |
| 2012/0110052 A1 | 5/2012 | Smarr et al. |
| 2012/0110621 A1 | 5/2012 | Gossweiler, III |
| 2012/0151322 A1 | 6/2012 | Lindsay et al. |
| 2012/0151342 A1 | 6/2012 | Trotta et al. |
| 2012/0151415 A1 | 6/2012 | Park et al. |
| 2012/0210386 A1 | 8/2012 | Kim et al. |
| 2012/0271883 A1 | 10/2012 | Montoya et al. |
| 2013/0073976 A1 | 3/2013 | McDonald et al. |
| 2013/0097556 A1 | 4/2013 | Louch |
| 2013/0106903 A1 | 5/2013 | Nagata et al. |
| 2013/0145291 A1 | 6/2013 | Weber et al. |
| 2013/0254709 A1 | 9/2013 | Koshimae et al. |
| 2013/0312027 A1 | 11/2013 | Baumel et al. |
| 2014/0032672 A1 | 1/2014 | Koshikawa et al. |
| 2014/0047074 A1 | 2/2014 | Chung et al. |
| 2014/0049692 A1 | 2/2014 | Sirpal et al. |
| 2014/0189010 A1 | 7/2014 | Brown et al. |
| 2014/0244659 A1 | 8/2014 | Liu et al. |
| 2014/0258110 A1 | 9/2014 | Davis et al. |
| 2014/0282208 A1 | 9/2014 | Chaudhri |
| 2014/0317116 A1 | 10/2014 | Shah et al. |
| 2014/0317201 A1 | 10/2014 | McNeil et al. |
| 2014/0317660 A1 | 10/2014 | Cheung et al. |
| 2014/0359789 A1 | 12/2014 | Pitt |
| 2015/0022558 A1 | 1/2015 | Li |
| 2015/0049591 A1 | 2/2015 | Adams et al. |
| 2015/0113436 A1 | 4/2015 | Penha et al. |
| 2015/0154676 A1 | 6/2015 | Matousek et al. |
| 2015/0200985 A1 | 7/2015 | Feldman et al. |
| 2015/0370798 A1 | 12/2015 | Ju et al. |
| 2016/0057154 A1 | 2/2016 | Ferguson et al. |
| 2016/0171453 A1 | 6/2016 | Zorfas |
| 2016/0197993 A1 | 7/2016 | Perkowski et al. |
| 2016/0232600 A1 | 8/2016 | Purves |
| 2016/0330258 A1 | 11/2016 | Sandhu |
| 2016/0337291 A1 | 11/2016 | Park et al. |
| 2016/0357305 A1 | 12/2016 | Wells et al. |
| 2016/0357368 A1 | 12/2016 | Federighi et al. |

(56) References Cited

U.S. PATENT DOCUMENTS

| | | | |
|---|---|---|---|
| 2016/0373455 | A1 | 12/2016 | Shokhrin et al. |
| 2016/0380952 | A1 | 12/2016 | Vora et al. |
| 2017/0060349 | A1 | 3/2017 | Munoz et al. |
| 2017/0131864 | A1* | 5/2017 | Edgar ............... G06F 3/0485 |
| 2017/0164063 | A1 | 6/2017 | Lewis et al. |
| 2017/0180299 | A1 | 6/2017 | Garza |
| 2017/0195736 | A1 | 7/2017 | Chai et al. |
| 2017/0242899 | A1 | 8/2017 | Jolley et al. |
| 2017/0270535 | A1 | 9/2017 | McKee et al. |
| 2017/0295249 | A1 | 10/2017 | Vickrey et al. |
| 2017/0315677 | A1 | 11/2017 | Rice et al. |
| 2017/0359290 | A1 | 12/2017 | Hsu et al. |
| 2018/0063278 | A1 | 3/2018 | Helled et al. |
| 2018/0113579 | A1 | 4/2018 | Johnston et al. |
| 2018/0121031 | A1 | 5/2018 | Ta et al. |
| 2018/0174106 | A1 | 6/2018 | Kenthapadi et al. |
| 2018/0192142 | A1 | 7/2018 | Paul |
| 2018/0218160 | A1 | 8/2018 | Wetherall et al. |
| 2018/0309806 | A1 | 10/2018 | Huynh et al. |
| 2018/0349485 | A1 | 12/2018 | Carlisle et al. |
| 2018/0349502 | A1 | 12/2018 | Maycock |
| 2018/0365270 | A1 | 12/2018 | Azout et al. |
| 2018/0373794 | A1* | 12/2018 | Dimson ............. G06N 5/022 |
| 2019/0095067 | A1 | 3/2019 | Huang et al. |
| 2019/0335008 | A1 | 10/2019 | Majoros et al. |
| 2020/0007675 | A1 | 1/2020 | Khanukaev |
| 2020/0151815 | A1 | 5/2020 | Whitfield |
| 2020/0211125 | A1 | 7/2020 | McCuskey |
| 2020/0218413 | A1* | 7/2020 | VanDuyn ............. G06F 3/0485 |
| 2020/0267435 | A1 | 8/2020 | Gordon et al. |
| 2020/0326839 | A1 | 10/2020 | Walkin et al. |
| 2021/0029131 | A1 | 1/2021 | Mertens et al. |
| 2021/0097630 | A1 | 4/2021 | Whilby |
| 2021/0105244 | A1 | 4/2021 | O'Rourke et al. |

OTHER PUBLICATIONS

Preinterview First Office Action received for U.S. Appl. No. 16/358,380 dated Aug. 5, 2020, 13 pages.

Holland, Jason, "Systems And Methods for Prioritizing Digital User Content Within a Graphical User Interface", U.S. Appl. No. 17/008,083, filed Aug. 31, 2020, 56 pages.

Preinterview First Office Action received for U.S. Appl. No. 16/358,962 dated Aug. 20, 2020, 14 pages.

Preinterview First Office Action received for U.S. Appl. No. 16/358,025 dated Apr. 30, 2020, 55 pages.

First Action Interview received for U.S. Appl. No. 16/358,025 dated Jul. 17, 2020, 55 pages.

Final Office Action received for U.S. Appl. No. 16/358,025 dated Sep. 2, 2020, 77 pages.

Non-Final Office Action received for U.S. Appl. No. 16/358,032 dated Apr. 3, 2020, 40 pages.

Final Office Action received for U.S. Appl. No. 16/358,032 dated Aug. 25, 2020, 45 pages.

Preinterview First Office Action received for U.S. Appl. No. 16/361,631 dated Oct. 2, 2020, 28 pages.

Preinterview First Office Action received for U.S. Appl. No. 16/358,969 dated Apr. 2, 2020, 18 pages.

Final Office Action received for U.S. Appl. No. 16/358,969 dated Jun. 15, 2020, 18 pages.

Notice of Allowance received for U.S. Appl. No. 16/358,969 dated Aug. 25, 2020, 15 pages.

Underwood, Patrick Joseph Roark, "Systems And Methods for Generating Digital Channel Content", U.S. Appl. No. 17/084,690, filed Oct. 30, 2020, 40 pages.

Underwood et al., "Snap Scroll", U.S. Appl. No. 29/684,315, filed Mar. 20, 2019, 16 pages.

Underwood et al., "Fanning Interface", U.S. Appl. No. 29/684,316, filed Mar. 20, 2019, 13 pages.

Underwood et al., "Display Device with Graphical User Interface", U.S. Appl. No. 29/685,031, filed Mar. 26, 2019, 12 pages.

Underwood et al., "Display Device with Graphical User Interface", U.S. Appl. No. 29/685,030, filed Mar. 26, 2019, 12 pages.

Underwood et al., "Display Device with Graphical User Interface", U.S. Appl. No. 29/685,029, filed Mar. 26, 2019, 14 pages.

Underwood et al., "Bottom-Focused Channel Overview", U.S. Appl. No. 29/684,604, filed Mar. 22, 2019, 15 pages.

Underwood et al., "Bottom-Focused Channel", U.S. Appl. No. 29/684,606, filed Mar. 22, 2019, 13 pages.

Underwood et al., "Display Screen with Graphical User Interface", U.S. Appl. No. 29/685,028, filed Mar. 26, 2019, 14 pages.

Underwood et al., "Vertical To Horizontal Interface Flow", U.S. Appl. No. 29/684,609, filed Mar. 22, 2019, 13 pages.

Underwood et al., "Limited Screen to Full Screen Interface Flow", U.S. Appl. No. 29/684,610, filed Mar. 22, 2019, 14 pages.

Holland, Jason, "Display Screen with a Graphical User Interface", U.S. Appl. No. 29/748,663, filed Aug. 31, 2020, 13 pages.

Holland, Jason, "Display Screen with a Graphical User Interface", U.S. Appl. No. 29/748,664, filed Aug. 31, 2020, 12 pages.

Holland, Jason, "Display Screen with a Graphical User Interface", U.S. Appl. No. 29/748,668, filed Aug. 31, 2020, 12 pages.

Holland, Jason, "Display Screen with a Graphical User Interface", U.S. Appl. No. 29/748,669, filed Aug. 31, 2020, 12 pages.

Holland, Jason, "Display Screen with a Graphical User Interface", U.S. Appl. No. 29/748,670, filed Aug. 31, 2020, 12 pages.

Non-Final Office Action received for U.S. Appl. No. 16/358,025 dated Mar. 1, 2021, 75 pages.

Non-Final Office Action received for U.S. Appl. No. 16/358,032 dated Feb. 3, 2021, 57 pages.

Final Office Action received for U.S. Appl. No. 16/358,380 dated Apr. 15, 2021, 51 pages.

Kalaska, Maciej, "RouteFinder app, posted at dribbble", URL: <https://dribbble.com/shots/6049671-RouteFinder-app> (Year: 2019), posting date Feb. 20, 2019. Site visited Apr. 24, 2021, 1 page.

Ex Parte Quayle Action received for U.S. Appl. No. 29/684,609 dated Apr. 28, 2021, 82 pages.

Final Office Action received for U.S. Appl. No. 16/358,962 dated Mar. 15, 2021, 37 pages.

Final Office Action received for U.S. Appl. No. 16/361,631 dated Apr. 8, 2021, 58 pages.

Ex Parte Quayle Action received for U.S. Appl. No. 29/684,315 dated Apr. 29, 2021, 87 pages.

Berrgmann, Martha, Home Screen Sliding Animation, posted at dribbble, URL: <https://dribbble.com/shots/4328249-Home-Screen-Sliding-Animation-1-15> posting date Mar. 10, 2016. Site visited Apr. 22, 2021, 1 page.

Nugroho, Adi, "Daily UI Challenge #10 Simple Date App, posted at dribbble", URL: <https://dribbble.com/shots/3710148-Daily-UI-Challenge-10-Simple-Date-App> posting date Aug. 3, 2017. Site visited Apr. 22, 2021, 1 page.

Li, Zhi et al., Chinese design No. 303978893, published at Orbit, Dec. 12, 2016, 14 pages.

Yang, Jinlong, Chinese design No. 303329806, published at Orbit, Aug. 12, 2015, 7 pages.

Piao, Rongwan et al., Chinese design No. 303479533, published at Orbit, Dec. 2, 2015, 6 pages.

Kang, You-Jin et al., Korean design No. 300944195, published at Orbit, Feb. 13, 2018, 7 pages.

Rahimi, Ehsan, "Music Playlist App Interaction, posted at dribbble", URL: <https://dribbble.com/shots/4650389-Music-Playlist-App-Interaction>, posting date May 30, 2018. Site visited Apr. 24, 2021, 1 page.

Ries, Vilem, "Wanderapp, posted at dribbble", URL: <https://dribbble.com/shots/5402223-Wander-app-interactions-2>, posting date Oct. 16, 2018. Site visited Apr. 24, 2021, 1 page.

Non-Final Office Action received for U.S. Appl. No. 29/684,316 dated Apr. 26, 2021, 75 pages.

Luo, Yi, "Chinese Design No. 304180173", published at Orbit, Jun. 16, 2017, 8 pages.

Song, Yuting, "Chinese Design No. 303841816", Sep. 7, 2016, 6 pages.

Liu, "Chinese Design No. 304005631", published at Orbit, Jan. 11, 2017, 4 pages.

(56) References Cited

OTHER PUBLICATIONS

Wang, Yufeng, "Chinese Design No. 303617576", Mar. 16, 2016, 7 pages.
Marcelino, Bruno, "Gestures Glamour: How to Set Up Swipeable Stacked Cards", URL: <https://www.outsystems.com/blog/posts/gestures_glamour_swipeable_stacked_cards/>, Mar. 9, 2018, 13 pages.
Perera, Nimasha, "Card Stack Animation—2, posted at dribbble", URL: <https://dribbble.com/shots/2377045-Card-Stack-Animation-2>, posting date Nov. 28, 2015. Site visited Apr. 20, 2021, 1 page.
Ex Parte Quayle Action received for U.S. Appl. No. 29/684,604 dated Apr. 27, 2021, 62 pages.
Gu, Fengtao, "Chinese design No. 304788552", Aug. 28, 2018, 5 pages.
Xiao, Yao Yao et al., "Chinese design No. 304992731, published at Orbit", Jan. 11, 2019, 5 pages.
Non-Final Office Action received for U.S. Appl. No. 29/684,606 dated Apr. 29, 2021, 79 pages.
Li, Xinrui et al., "Chinese design No. 304220928", Jul. 28, 2017, 9 pages.
Xin, "Chinese design No. 304619594, published at Orbit", May 8, 2018, 9 pages.
Wang, Hong et al., Chinese design No. 303670237, published at Orbit, publication date May 11, 2016. Site visited Apr. 21, 2021. Available from Internet. (Year: 2016), 6 pages.

\* cited by examiner

SYSTEMS AND METHODS FOR DIGITAL CONTENT NAVIGATION BASED ON DIRECTIONAL INPUT

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
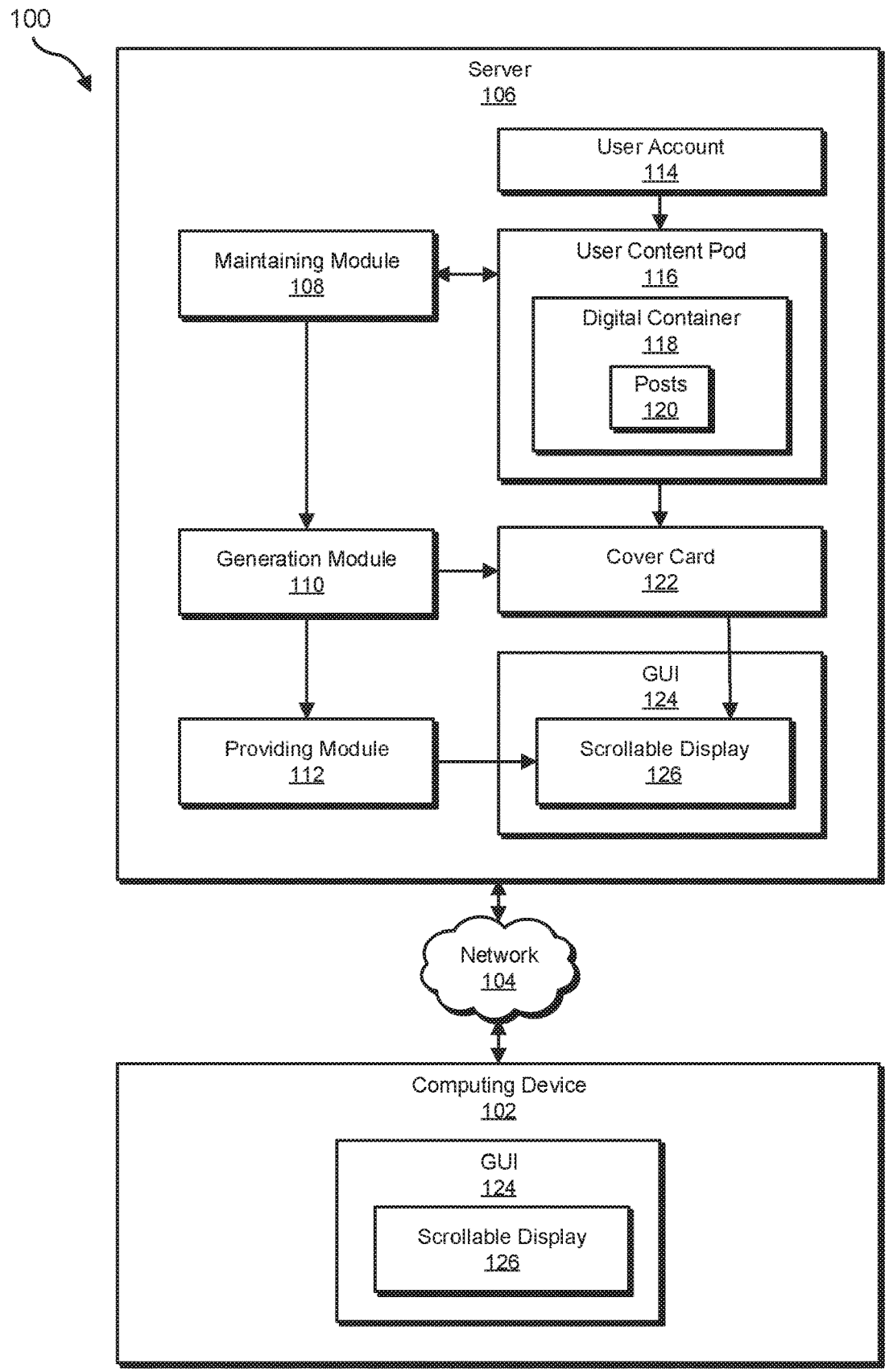
FIG. 1 is a block diagram of an exemplary system for digital content navigation based on directional input.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

Features from any of the embodiments described herein may be used in combination with one another in accordance with the general principles described herein. These and other embodiments, features, and advantages will be more fully understood upon reading the following detailed description in conjunction with the accompanying drawings and claims.

DETAILED DESCRIPTION OF EXEMPLARY EMBODIMENTS

The present disclosure is generally directed to systems and methods for enabling digital navigation of two different data structures within a single-surface display. In some examples, the single-surface display may enable navigation of both (1) a scrollable digest of pods (e.g., storage containers for a user's posts to a social networking platform) and (2) a display of individual posts within a pod. In one such example, vertical swiping and/or scrolling may be used to navigate from one pod to another within the digest and horizontal swiping and/or scrolling may be used to navigate between the individual posts of a pod. Additionally or alternatively, the single-surface display may enable a user to alternate between multiple pod views (e.g., between a view of the scrollable digest of pods, a scrollable summary view of the posts within a pod, and/or a full-screen view of a post within a pod).

In one embodiment, the social networking platform may generate a digital cover card for each pod and the scrollable digest of pods may present as a display of pod cover cards. In some such embodiments, a graphical user interface (GUI) dedicated to the display may consist exclusively of pod cover cards (e.g., displayed two a row within the graphical user interface). In these embodiments, additional posts of a pod may only be displayed (e.g., via the summary view of the posts) in response to receiving user input selecting a cover card from the digest display. In other embodiments, the digest of pods may display a series of rows, with each row dedicated to a different pod. In this embodiment, each row may include a horizontally scrollable display of posts within its pod.

In some examples, a post and/or cover card may include information relating to public comments made to the post and/or to a post associated with the cover card. In one such example, a comment affordance provided within the post and/or cover card may show only a first name of a user who has posted a public comment, without showing the contents of the comment. In these examples, a viewer may only be shown the contents of the comment in response to selecting the comment affordance.

The systems described herein may conserve computing resources (e.g., memory, network bandwidth, etc.) by presenting content from multiple feeds in a single-surface display, reducing the number of different displays requested by a user in order to view content. For example, the systems described herein may enable the digital retrieval of content from a pod digest feed and from a feed of posts within an individual pod using a single digital display, requiring the server to serve, the network to transmit, and the endpoint to load only the single digital display resources and the user content rather than serving, transmitting, and loading the pod digest feed resources and the individual posts feed resources repeatedly as a user switches back and forth between multiple feeds. In some embodiments, by organizing content into pods represented by cover cards and fetching posts on an as-requested basis, the systems described herein may serve, transmit, and load a smaller and/or resource-lighter (e.g., containing more still images and fewer videos) array of content compared to serving, transmitting, and loading posts in a feed.

FIG. 1 is a block diagram of an exemplary system 100 for digital content navigation based on directional input. In one embodiment, and as will be described in greater detail below, a server 106 may be configured with a maintaining module 108 that maintains a user content pod 116 for each user account 114 of a social networking platform. Each user content pod 116 may represent and/or include a digital container 118 for one or more compositions (e.g., posts 120) posted to the social networking platform by its corresponding user account 114. In some examples, a generation module 110 may generate a cover card 122 for each user content pod 116. In one embodiment, a providing module 112 may provide, within GUI 124 for interacting with posts 120 made to the social networking platform, a scrollable display 126 of vertically arranged selectable cover cards configured to (1) scroll vertically between cover cards of different user content pods in response to receiving vertical swiping input and (2) scroll horizontally between one or more posts of an individual user content pod in response to receiving horizontal swiping input.

Server 106 generally represents any type or form of backend computing device that may perform one or more functions directed at enabling digital social networking. In some examples, server 106 may perform social networking functions for and/or in conjunction with a social networking platform. Although illustrated as a single entity in FIG. 1, server 106 may broadly represent any physical or virtual server and/or group of physical and/or virtual servers connected by one or more networks.

In some embodiments, a computing device 102 may display GUI 124 and/or scrollable display 126 to enable a user to interact with content on the social networking platform. In some embodiments, computing device 102 may communicate with server 106 via a network 104. Computing device 102 generally represents any type or form of computing device capable of reading computer-executable instructions. For example, computing device 102 may represent a smart phone and/or a tablet. Additional examples of computing device 102 may include, without limitation, a laptop, a desktop, a wearable device, a personal digital assistant (PDA), etc.

In some examples, user account 114 may be registered with the social networking platform and computing device 102 may have installed an instance of a social media application that operates as part of the social networking platform (e.g., that enables access to services provided by the social networking platform). In addition, or as an alternative, to having the social media application installed, computing device 102 may have installed a browser that may navigate to one or more webpages maintained by the social networking platform. The term "social networking platform" generally refers to any type or form of digital architecture, provided via server 106, that enables digital social networking. In some examples, the social networking platform may provide one or more status-broadcasting services that enable users to broadcast, consume, and/or digitally respond to user-generated compositions. In one such example, server 106 may provide a pod-based sharing framework, as will be described in greater detail below.

Figure 2:
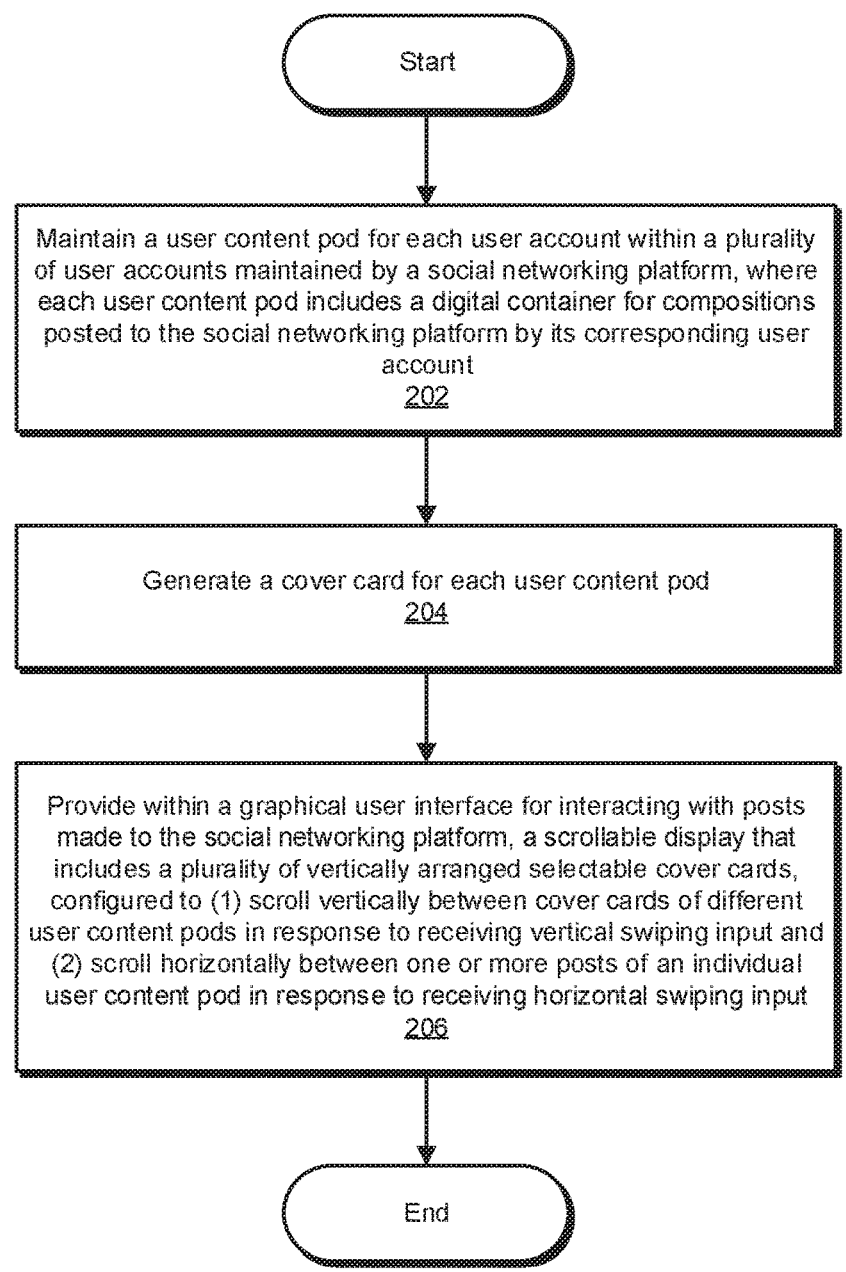
FIG. 2 is a flow diagram of an exemplary method for digital content navigation based on directional input.

FIG. 2 is a flow diagram of an exemplary method 200 for providing a single-surface display that enables navigation of both a pod cover display and the posts of individual pods. As illustrated in FIG. 2, at step 202, one or more of the systems described herein may maintain a user content pod for multiple user accounts (e.g., each user account) of a social networking platform, where each user content pod includes a digital container for one or more compositions posted to the social networking platform by its corresponding user account. For example, maintaining module 108 may, as part of server 106 in FIG. 1, maintain user content pod 116 for user account 114 of a social networking platform, which may include digital container 118 for one or more compositions posted to the social networking platform by its corresponding user account 114.

The term "digital container" may refer to any type or form of data structure that stores user-generated digital content. In some embodiments, a digital container may be a specific type of data structure, such as an array, a stack, a heap, and/or any other suitable data structure. In one embodiment, a digital container may be defined and/or represented in a database (e.g., as a row, a column, a collection of cells, etc.). In some embodiments, objects within the same digital container may share a label, key, and/or other type of tag that is associated with the digital container. For example, objects within the same digital container may all be tagged with an identifier representing the user account associated with the pod that includes the digital container.

The term "pod" or "user content pod" may refer to any type or form of digital container, maintained by a social networking platform, that is dedicated to storing social media compositions from a designated source (e.g., from a designated user account, digital group, or page of the social networking platform). A user account may generally refer to an account associated with an individual user and/or an entity (e.g., a business, a campaign, a news outlet, etc.). A digital group may generally refer to a group account associated with a designated set of individual users and/or entities (i.e., a designated set of individual user accounts). In some examples, an administrator account (i.e., one or more user accounts designated as an administrator) may manage the group account and one or more contributor accounts (i.e., user accounts designated as contributors to the group account) may add compositions to the group account's digital container. In some examples, a digital group may be based on a mutual interest. A page may generally refer to an individual but non-personal account, such as an account for a business or hobby belonging to a user, where content posted relates to the user's business or hobby rather than the user personally. In other examples, a page may belong to an organization.

In some examples, maintaining module 108 may automatically create a primary pod for each user account that is registered with the social networking platform, which may be dedicated to storing social media compositions created by its corresponding user account. In these examples, maintaining module 108 may maintain each primary pod as long as its corresponding user account is active. Maintaining module 108 may also allow a user to create and add social media compositions to one or more additional pods (e.g., additional individual pods and/or additional group pods). In some examples, an additional pod may be permanent (e.g., configured to be maintained as long as the user account that created the additional pod is active and/or until the user account has terminated the additional pod). In other examples, an additional pod may be ephemeral (e.g., set to expire after a certain amount of time).

Each pod may be designated by a name that distinguishes the pod from other pods. In some examples, the name may be assigned to the pod automatically. For example, a primary pod may be automatically assigned the name associated with its corresponding user account (e.g., the primary account created for the user account of an individual named "Mindy Harris" may be "Mindy Harris.") In other examples, the name may be configurable by a user. For example, an additional pod may be assigned with a name submitted via user input at the time the additional pod is created.

In some examples, a pod may be limited to only storing social media compositions from a single source (e.g., only a single user account may have permission to add social media compositions to the pod). In other examples, a group pod may be limited to only storing posts from a predetermined set of sources (e.g., a limited set of user accounts may have permission to add content to the pod). Additionally or alternatively, a pod may have an open configuration (e.g., selected by an administrator account managing the pod) in which any user account of the social media platform may add content to the pod.

In addition to storing social media compositions, pods may be used as a vehicle for sharing social media compositions (e.g., via a consumption interface such as GUI 124, as will be discussed in greater detail below in connection with step 204). In some examples, an audience for a pod may be configurable. For example, a user may select an audience for a pod via a setting in his or her user account. In examples in which a user account may add social media compositions to multiple different pods, a user of the user account may select an audience (e.g., a different audience) for each of the pods. In some embodiments, the systems described herein may include default pod settings for posts within a pod. For example, posts within a pod may be set to be ephemeral by default. In another example, posts within a pod may be set to disable public comments by default (e.g., enabling only private replies to posts). Additionally or alternatively, the systems described herein may enable a user to configure pod post setting.

A user content pod may include posts (i.e., posted user compositions) of a variety of different types. For example, a user content pod may include discrete text-based posts, media-based posts (which may include either a single media item or a collage of multiple media items), and/or reference-based posts (e.g., with a link to an online article). In consequence, posts may include a variety of content, including but not limited to a digital photograph, a graphic, text, a digital video and/or a digital recording of a music composition.

Maintaining module 108 may determine content to include in a user content pod in a variety of ways. In some embodiments, maintaining module 108 may add any post to the user content pod that is created via its corresponding user account. Additionally or alternatively, in embodiments in which a user account is associated with multiple pods, maintaining module 108 may add each post to a pod designated by the user at the time of the post's creation. In one embodiment, maintaining module 108 may remove posts from a user content pod as the posts expire (e.g., at the end of a predetermined timed expiration period) and/or in response to the posts being deleted by the posts' corresponding user accounts.

Maintaining module 108 may sort posts within a user content pod (e.g., may set a default display order for the posts when displayed within a pod content interface) based on a variety of metrics. For example, maintaining module 108 may sort posts within a user content pod based on the creation date of a post, engagement with a post (e.g., comments, shares, reactions, etc.), a user-designated order, and/or any other suitable metric.

Returning to FIG. 2, at step 204, one or more of the systems described herein may generate a cover card for each user content pod. For example, generation module 110 may, as part of server 106 in FIG. 1, generate cover card 122 for user content pod 116.

The term "cover card" may generally refer to any visual representation of content associated with a user content pod. In some embodiments, a cover card for a pod may include visual representations and/or depictions of one or more compositions within the pod. For example, a cover card may include an image and/or text from a composition within a pod. In one such example, a cover card may be a depiction of a single post within a pod (e.g., a depiction of an image, text, and/or video from the single post). Additionally or alternatively, a cover card of a pod may include the name and/or a user icon (e.g., profile picture, avatar, etc.) of a user account associated with the pod. In some examples, a cover card may include information about the posts within a pod, such as the number of posts in the pod.

Figure 3A:
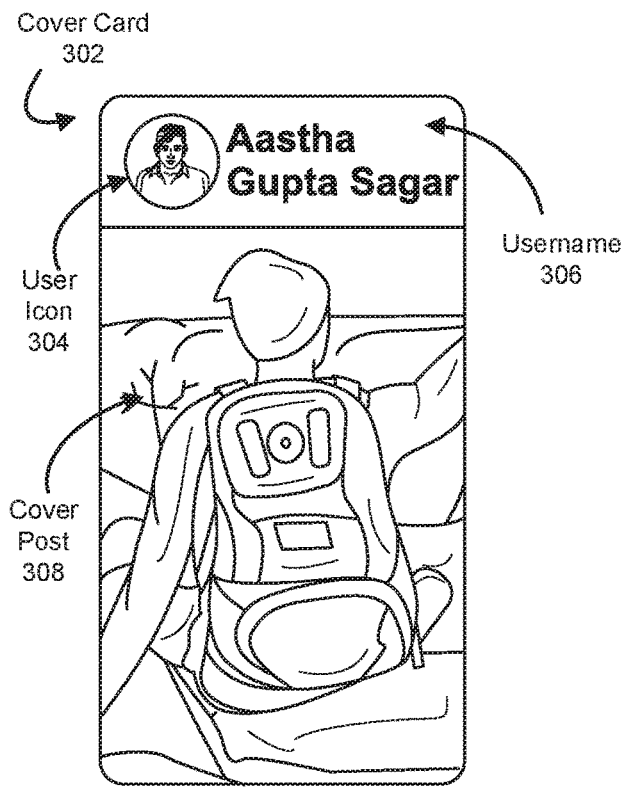
FIGS. 3A, 3B, and 3C are illustrations of exemplary cover cards.
Figure 3B:
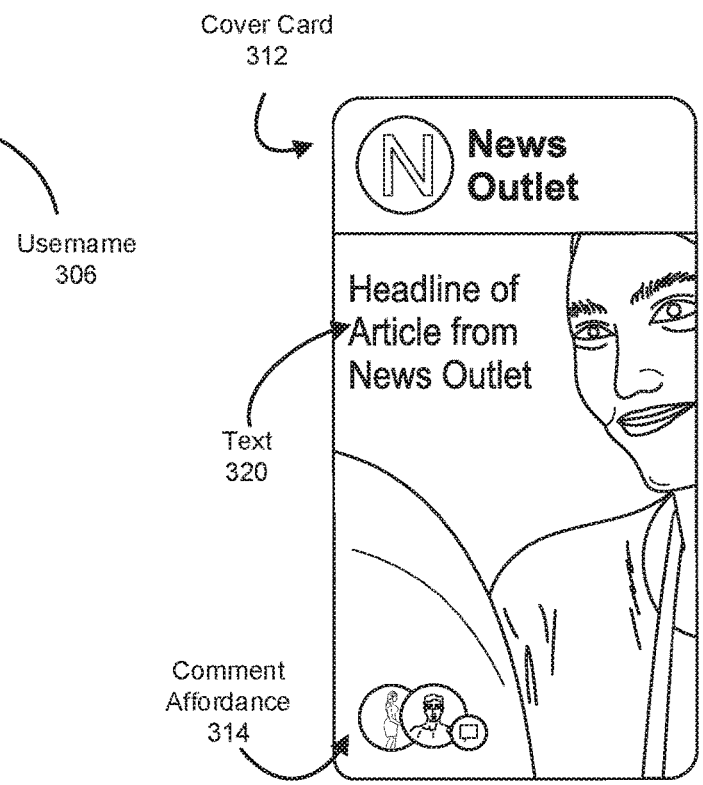

In some embodiments, generation module 110 may generate a cover card automatically based on content within the pod. For example, generation module 110 may select an image for display within the cover card from a post within the pod that is most recent, has the highest engagement (e.g., comments and/or reactions), has been pre-selected by the user as a featured post, and/or some other metric. FIG. 3A provides an exemplary illustration of a cover card 302, which includes an image from a post, a user icon 304 of the user account associated with the pod and a username 306 of the user account. FIG. 3B provides an additional exemplary illustration of a cover card 312 that includes text (i.e., a headline of a news article) from a post that features the news article. In one embodiment, if one or more posts within the pod is configured to enable commenting, cover card 312 may include a comment affordance 314 that shows icons of users who have commented on the post. In some examples, selecting comment affordance 314 may cause the systems described herein to display the comments on the post (e.g., by transitioning from the scrollable display of pod covers to a full-screen post display that includes comments).

Figure 3C:
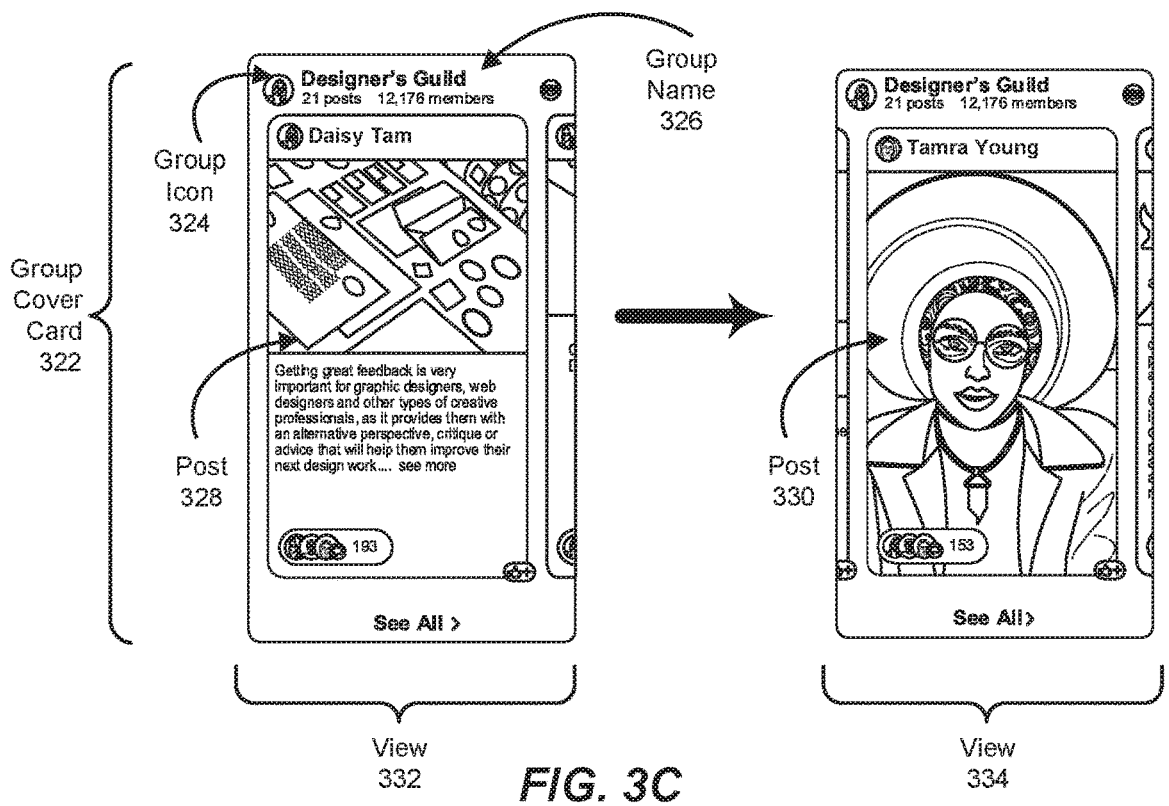

In embodiments in which maintaining module 108 maintains pods for groups of accounts (i.e., group pods), generation module 110 may generate cover cards for group pods that visually differ from cover cards for pods associated with an individual user account. As illustrated in FIG. 3C, in addition to including a group icon 324 and/or group name 326, a group cover card 322 may include a depiction of one or more posts 328 with a user icon and/or name of the individual account that added the post to the group pod. In some examples, group cover card 322 may include additional information relating to the group pod, such as a number of members to the group pod (e.g., "12,176" in FIG. 3C) and/or a number of posts in the group pod (e.g., "21" in FIG. 3C).

In some embodiments, the systems described herein may position and/or display group cover cards differently within the scrollable display from cover cards for individual accounts. For example, the systems described herein may display cover cards for group pods as larger than cover cards for individual user account pods. As another example, group cover cards may include a depiction of multiple posts. For example, as shown in FIG. 3C, a view 332 may include a post 328 while a view 334 (e.g., accessible by scrolling sideways, without expanding the cover card or leaving the scrollable display) may include a post 330. In this example, a default configuration of cover cards for pods associated with a single account may include a depiction of only one post (e.g., as shown in FIGS. 3A and 3B).

Generation module 110 may generate the cover cards in a variety of ways. In some examples, generation module 110 may generate a single cover card for each pod that is stored in association with the pod and is retrieved for display to every user who is eligible to view the contents of the pod. In some embodiments, generation module 110 may re-generate the stored cover card for a pod every time the contents of the pod changes (e.g., due to posts being added and/or expiring). For example, whenever a post is added to the pod, generation module 110 may update the cover post featured in the cover card to be the most recent post. In other embodiments, generation module 110 may generate a cover card on the fly when a user loads the scrollable display. For example, generation module 110 may check the current contents of the pod and generate the cover card based on those contents and/or check the preferences of the user viewing the scrollable display and generate the cover card based on those preferences.

In certain embodiments in which generation module 110 generates cover cards on the fly, generation module 110 may personalize a cover card for a user viewing the cover card. For example, generation module 110 may preferentially include within the cover card depictions of posts in which the user is tagged in the cover card, may exclude depictions of posts which the user has already viewed, may sort depictions of posts in the cover card according to the user's preferences (e.g., newest first, most popular first, etc.), and/or may otherwise personalize the cover card. Additionally or alternatively, generation module 110 may generate cover cards based at least in part on the preferences of the user account associated with the pod for which the cover card is being generated. For example, generation module 110 may select a cover post for the cover card based on user preferences for selecting the most recent post, the post with the highest engagement, and/or a post designated by the user.

Returning to FIG. 2, at step 206, one or more of the systems described herein may provide, within a graphical user interface for interacting with posts made to the social networking platform, a scrollable display of vertically arranged selectable cover cards. For example, providing module 112 may, as part of server 106 in FIG. 1, provide, within GUI 124 for interacting with posts 120 made to the social networking platform, scrollable display 126 of vertically arranged selectable cover cards. The scrollable display may enable navigation of two different data structures (e.g., a digest of pod covers and a display of posts within an individual pod). For example, the scrollable display may be configured to (1) scroll vertically between cover cards of different user content pods in response to receiving vertical swiping input and (2) scroll horizontally between one or more posts of an individual user content pod in response to receiving horizontal swiping input.

Providing module 112 may provide (e.g., transmit) the scrollable display in a variety of ways and/or contexts based on the type and/or configuration of an endpoint device. For example, providing module 112 may serve the scrollable display to a web browser and/or social media application on a user's mobile phone. In some embodiments, providing module 112 may provide the scrollable display via a combination of front-end code (i.e., code that executes on an endpoint device that displays the scrollable display on a screen) and back-end code (i.e., code that executes on a server). In some embodiments, providing module 112 may transmit code and/or data describing the scrollable display from a server to an endpoint device via the Internet.

Providing module 112 may select which pods to display in the scrollable display based on a variety of criteria. In some embodiments, which pods are visible to a user may be based on the permission settings of the accounts associated with the pods. For example, a pod of a first user account may be visible in the scrollable display of a second user account because the first user account is on a friends list of the second user account and the first user account's permission settings enable sharing the pod with friends. In another example, a pod may be visible in a scrollable display because the pod is configured to be publicly visible. Additionally or alternatively, which pods are visible in a scrollable display may be based on user data (e.g., user history and/or feed preferences) of the user viewing the pods. For example, the systems described herein may generate a personalized scrollable display (i.e., a personalized pod feed) for each user account and may select pods to represent in the display based on the user account's user data. In one example, a user account may configure its scrollable display (e.g., pod feed) to only show content from a specified list of pods. In another example, a user account may configure its scrollable display to show content created by user accounts followed by the user account, regardless of pod (e.g., the feed may include a group pod if one of the accounts in the group is followed by the user).

The systems described herein may load available cover cards in a variety of ways and in response to a variety of triggers. In some embodiments, the systems described herein may continue loading new cover cards as long as the user continues swiping and/or scrolling vertically. For example, the systems described herein may dynamically load additional cover cards as/before the user reaches the end of the currently loaded cover cards. In some examples, the systems described herein may loop back to the beginning of the displayed cover cards after hitting a cover card limit. For example, a predetermined numeric limit such as 40 cover cards and/or a limit based on the total viewable pods for the user. Alternatively, the systems described herein may display a message indicating that the user has viewed all available cover cards.

Providing module 112 may provide a scrollable display with a variety of different default configurations (e.g., an initial and/or starting configuration presented when the scrollable display is first loaded). In some embodiments, a default configuration of the scrollable display may include a display of posts within a pod in addition to the pod's cover card. For example, the systems described herein may provide a default configuration of the scrollable display that includes (e.g., alongside, within, and/or beneath each cover card) a display of posts from the corresponding user content pod displayed in a horizontal arrangement. As a specific example, illustrated in FIG. 4, the systems described herein may direct a mobile device 402 to display a scrollable display 404 in which cover cards for pods are arranged vertically (e.g., cover cards 406 and 416), with contents from each pod arranged horizontally below the cover card (e.g., posts 408 and 410 and posts 412 and 414, respectively).

In one example, a cover card 406 may include information about the pod as a whole, such as the name and/or icon of the user account associated with the pod, while post 408 may include information from a specific post, such as an image and/or text from the post. In one example, post 408 may also include information about the post, such as a title of the post, information about comments on the post (e.g., a comment affordance that shows the first name of a user who has commented but not the comment itself), an icon relating to the post (e.g., based on the category of post, whether the post is highlighted by the user that created the post, etc.), and/or information about users tagged in the post. In some embodiments, horizontally scrolling through the posts associated with a pod may reveal additional posts. In one embodiment, horizontally scrolling through the posts and/or selecting the posts or cover card (e.g., via swiping, tapping, etc.) may expand the display of posts vertically to occupy more space in the scrollable display, displacing or blocking other cover cards.

Figure 5:
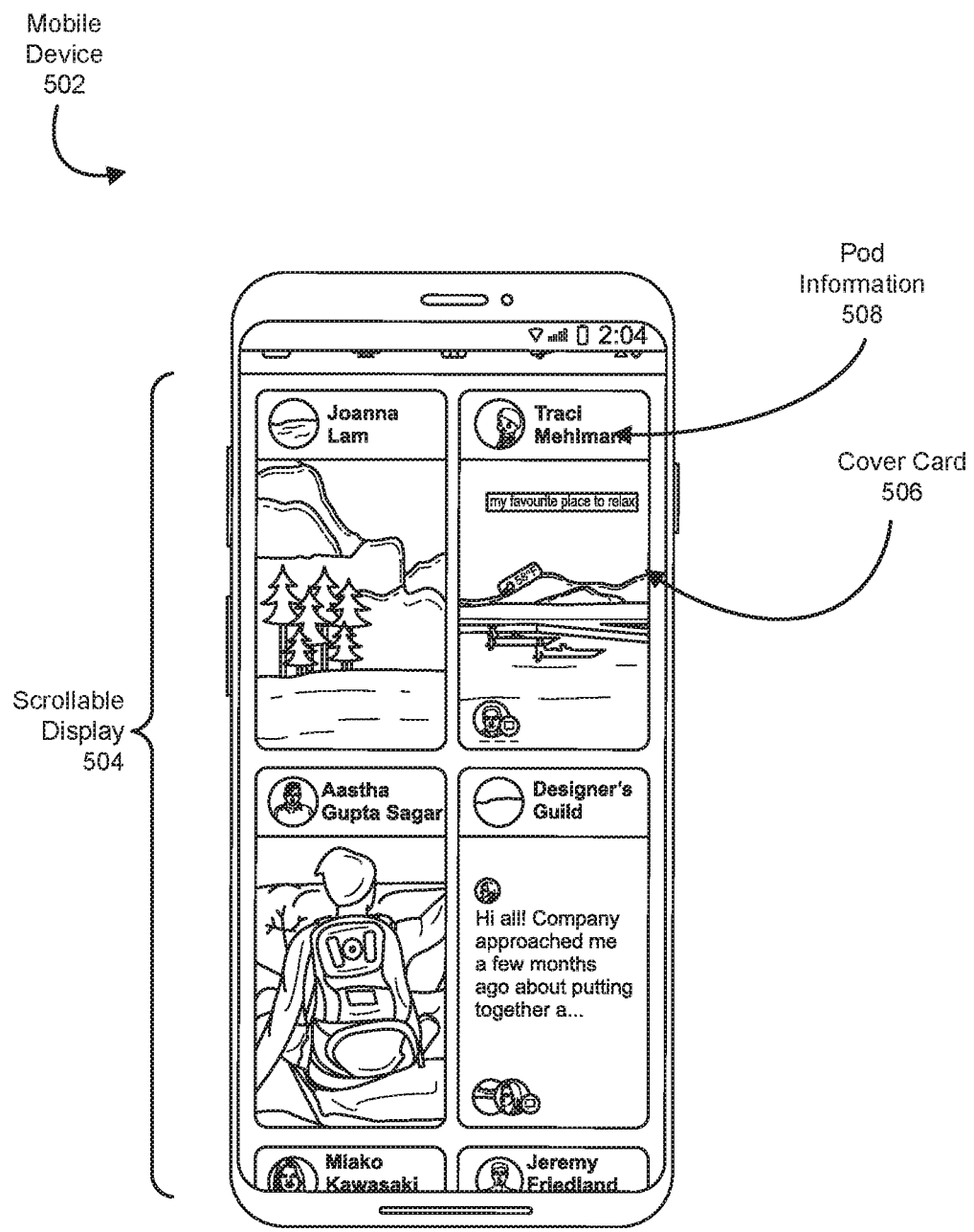
FIG. 5 is an illustration of an exemplary single-surface display for user content.

As an alternative to the default configuration of the scrollable display that includes depictions of posts in addition to cover cards, in some embodiments, the default configuration may include only or mostly cover cards (e.g., without presenting additional content for a user content pod beyond the user content pod's cover card). In one embodiment, the cover cards may be arranged in a two-wide grid. For example, as illustrated in FIG. 5, the systems described herein may direct a mobile device 502 to display a scrollable display 504 of same-sized cover cards arranged in a two-wide grid. In some embodiments, in addition to the same-sized cover cards arranged side by side (e.g., in a two-wide grid), the scrollable display may also contain large cover cards that individually occupy a row of grid spaces. For example, a group pod cover card may occupy an entire row while individual account pod cover cards may be arranged two to a row. In one example, as depicted in FIG. 3C, an exemplary scrollable display may include a group cover card that occupies a row of grid spaces and features multiple posts, as opposed to individual pod cover cards, which occupy a single grid space and feature a single post each.

User input to a default scrollable display of only or mostly cover cards (e.g., arranged in a two-wide grid) may trigger a variety of digital events. In some examples, the default configuration may be configured to transform into an expanded pod configuration (i.e., an expanded view) in response to receiving user input selecting a cover card. In some such examples, vertical scrolling may be enabled in either the default configuration or the expanded-pod configuration of the scrollable display while horizontal scrolling may be only enabled in the expanded-pod configuration.

Figure 6:
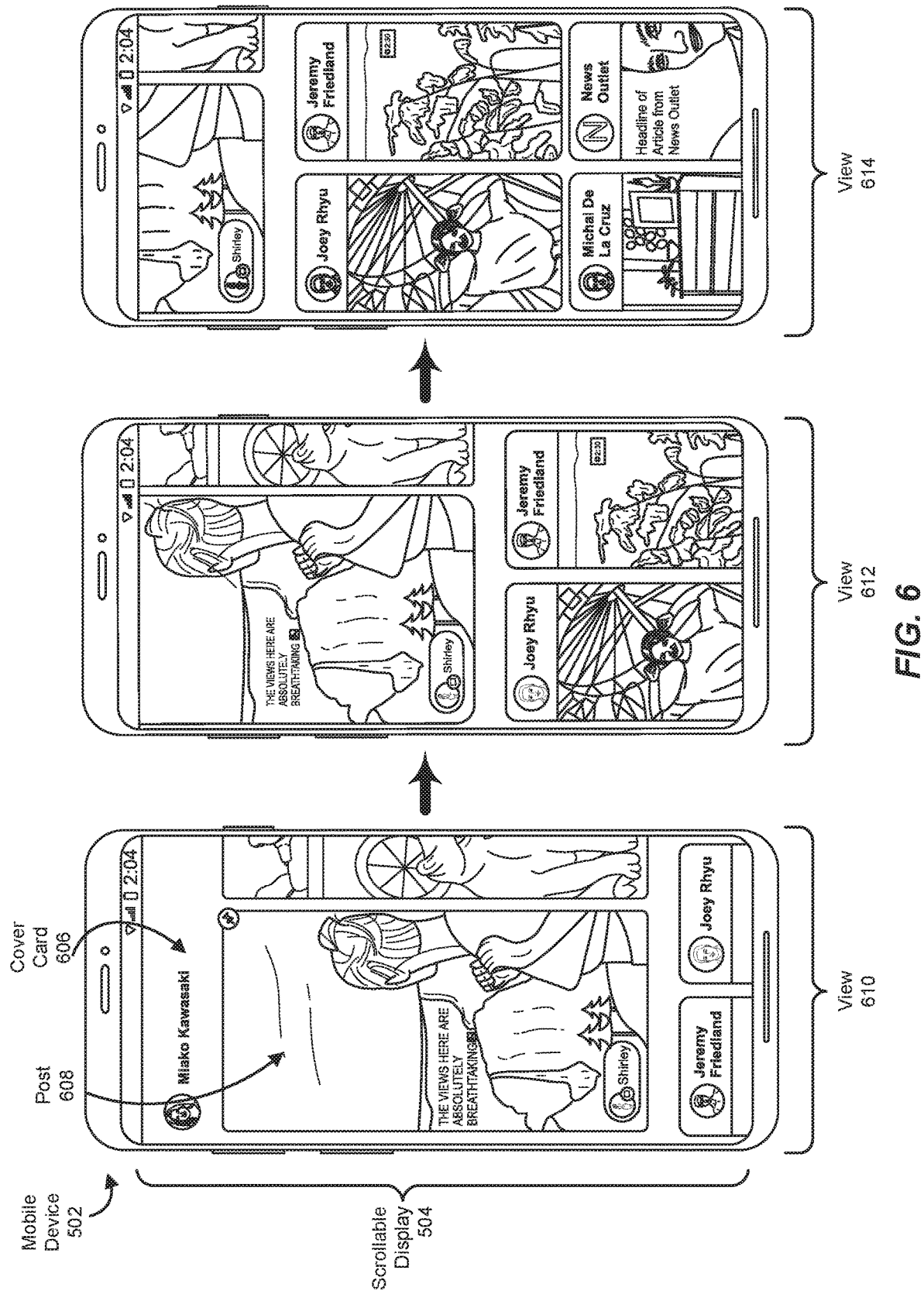
FIG. 6 is an illustration of an exemplary single-surface display for user content following a user interaction.

A default scrollable display of only or mostly cover cards may transform to an expanded pod configuration in a variety of ways. In some embodiments, user input selecting a cover card may trigger the selected cover card to expand vertically and/or horizontally (e.g., to display information about posts within the pod). In these embodiments, the systems described herein may shift other cover cards in the row of a selected cover card (and/or in the rows above or below a selected cover card) upwards or downwards, out of the way of the expanded cover card. As a specific example, the default scrollable display 504 depicted in FIG. 5, which presents cover cards in a two-by-two grid, may expand (in response to user input selecting cover card 506) to an expanded configuration (such as the configuration depicted in FIG. 6) in which other cover cards are shifted out of the way. As illustrated in FIG. 6, cover card 606 in the expanded configuration may display one or more posts within its corresponding user content pod (e.g., posts 602 and 604). In one example, the systems described herein may display additional information about a post in an expanded view, such as additional icons, comment information, and/or post contents (e.g., as depicted in FIG. 6).

Figure 7:
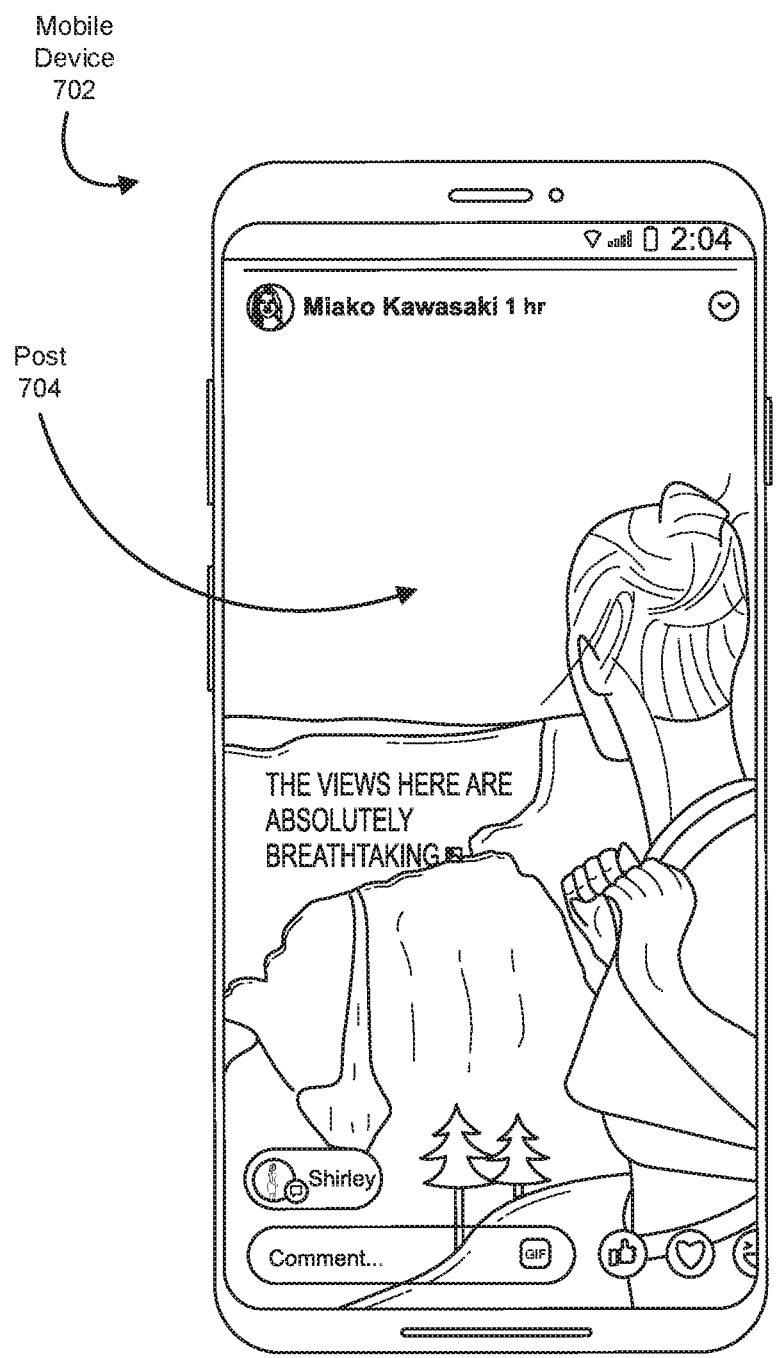
FIG. 7 is an illustration of an exemplary full-screen display of user content.

In some embodiments, the expanded cover card may further expand into a full-screen view of a post, in response to receiving user input selecting the post as displayed in the expanded cover card, as illustrated in FIG. 7 with post 704. In one embodiment, the full-screen view may be displayed directly in response user input selecting a corresponding cover card from the default scrollable display. The systems described herein may display different variations of the full-screen view depending on the type of post. In one example, if a post is an image or video post, the full-screen view of the post may show the image or video zoomed to fit the screen of mobile device 702. In another example, if a post is a text post, the full-screen view of the post may display as much text as fits on the screen of mobile device 702 and may enable the user to scroll vertically to see more text.

Once providing module 112 has provided an expanded view of a scrollable display, such as the expanded view displayed in FIG. 6, the expanded view may revert (e.g., collapse) back to the default view in response to a variety of triggers. For example, in some examples, the systems described herein may display a close button on an expanded cover card that, when selected, collapses the expanded cover card, reverting back to the default display. Additionally or alternatively, the systems described herein may collapse the expanded cover card in response to receiving vertical scrolling as input. Additionally or alternatively, the systems described herein may collapse the expanded cover card upon receiving input selecting a new cover card (e.g., and may, in some examples, expand the display of the new cover card). In some embodiments, the systems described herein may not collapse the expanded cover card in response to vertical scrolling, as illustrated in the transitions from view 610 to view 612 and then view 614. In these embodiments, the expanded view may passively transition back to a default view as the expanded cover card is scrolled out of view.

Figure 8:
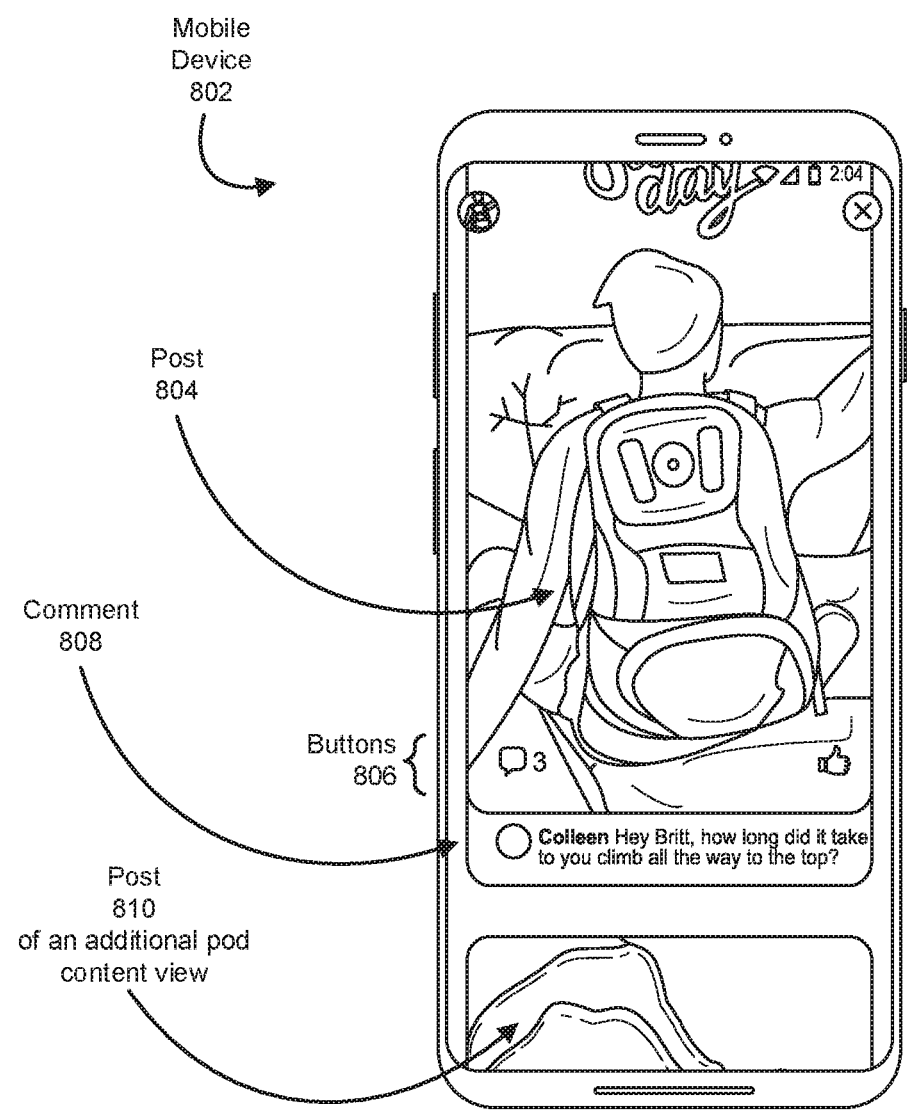
FIG. 8 is an illustration of an exemplary single-surface display for user content.

In addition to expanded views in which cover cards are shifted to make room for an expanded pod, in some embodiments, other cover cards may be obscured (e.g., blocked from view) by an expanded cover card. In these embodiments, an expanded configuration may represent a full-screen pod display (i.e., a pod content view and/or a scrollable summary view) that includes a display of the posts from a single pod rather than including cover cards of multiple pods. Using FIG. 8 as a specific example, the systems described herein may, e.g., in response to receiving user input selecting a cover card from a default scrollable display, direct a mobile device 802 to display a pod content view of posts (e.g., post 804) from a single pod. In one embodiment, the depiction of a post may include various information from/about the post, including images and/or text from the post (e.g., a headline of a news article), information about comments on the post, and/or icons related to the post (e.g., as depicted in FIG. 8). In some examples, if the pod is a group pod, the systems described herein may display the name and/or icon of the user account that contributed the post to the pod in addition to displaying the name of the group in a banner at the top of the pod content view (not depicted in FIG. 8).

The systems described herein may display various interactable elements and/or receive various types of input in a pod content view, as depicted in FIG. 8. In one embodiment, the systems described herein may display buttons 806, such as a comment button, a share button, a reaction button, and/or other buttons that enable a user to interact with post 804. In some examples, upon receiving horizontal swiping and/or scrolling input, the systems described herein may display additional posts within the pod. In some embodiments, the systems described herein may loop through the posts in the pod once a user has scrolled through all the posts within the pod. In one embodiment, the systems described herein may display additional posts in a pod in response to receiving vertical swiping and/or scrolling input. Additionally or alternatively, the systems described herein may transition to a pod content view of a different pod (e.g., corresponding to post 810 in FIG. 8) in response to receiving vertical swiping and/or scrolling input (as depicted in FIG. 8).

In some embodiments, the systems described herein may enable user commenting and may display user comments on posts within pods. In one embodiment, the systems described herein may display all comments on a post. Alternatively, the systems described herein may select a single comment for display, as illustrated by comment 808 in FIG. 8, which may be selected for display based on the age of the comment (e.g., oldest comment or most recent comment), the level of engagement with the comment (e.g., reactions and/or replies to the comment), and/or some other criteria (e.g., the user account which posted the comment). In one such embodiment, receiving user input selecting the single comment may cause the systems described herein to transition to a full-screen display of a post (e.g., which displays additional comments on the post) and/or to transition to a dedicated-comment display with additional comments (e.g., all comments).

In some embodiments, comments on the posts within a pod may only be visible in certain views. For example, a default view that displays only cover cards may not display comments (e.g., comments may only be shown in an expanded view and/or full-screen view). In such embodiments, comments may only be shown to intentional viewers (i.e., viewers that have shown more than a casual interest in the contents of a pod as expressed by navigating to an expanded or full-screen version of the pod). In some embodiments, a comment-creation view, which enables creating a comment for a post, may display privacy options selected for post. For example, the systems described herein may display text indicating an audience that will be enabled to view the comment (e.g., all users, friends of the user who created the post, a specific list of users, etc.).

In some embodiments, the systems described herein may enable a user to toggle between the various views (i.e., configurations) of the scrollable display described herein using different scrolling input. For example, upon receiving horizontal or vertical swiping and/or scrolling input, the systems described herein may transition to a different view (e.g., to a full-screen view of another post from the same pod or a pod content view of posts from a different pod).

Figure 9:
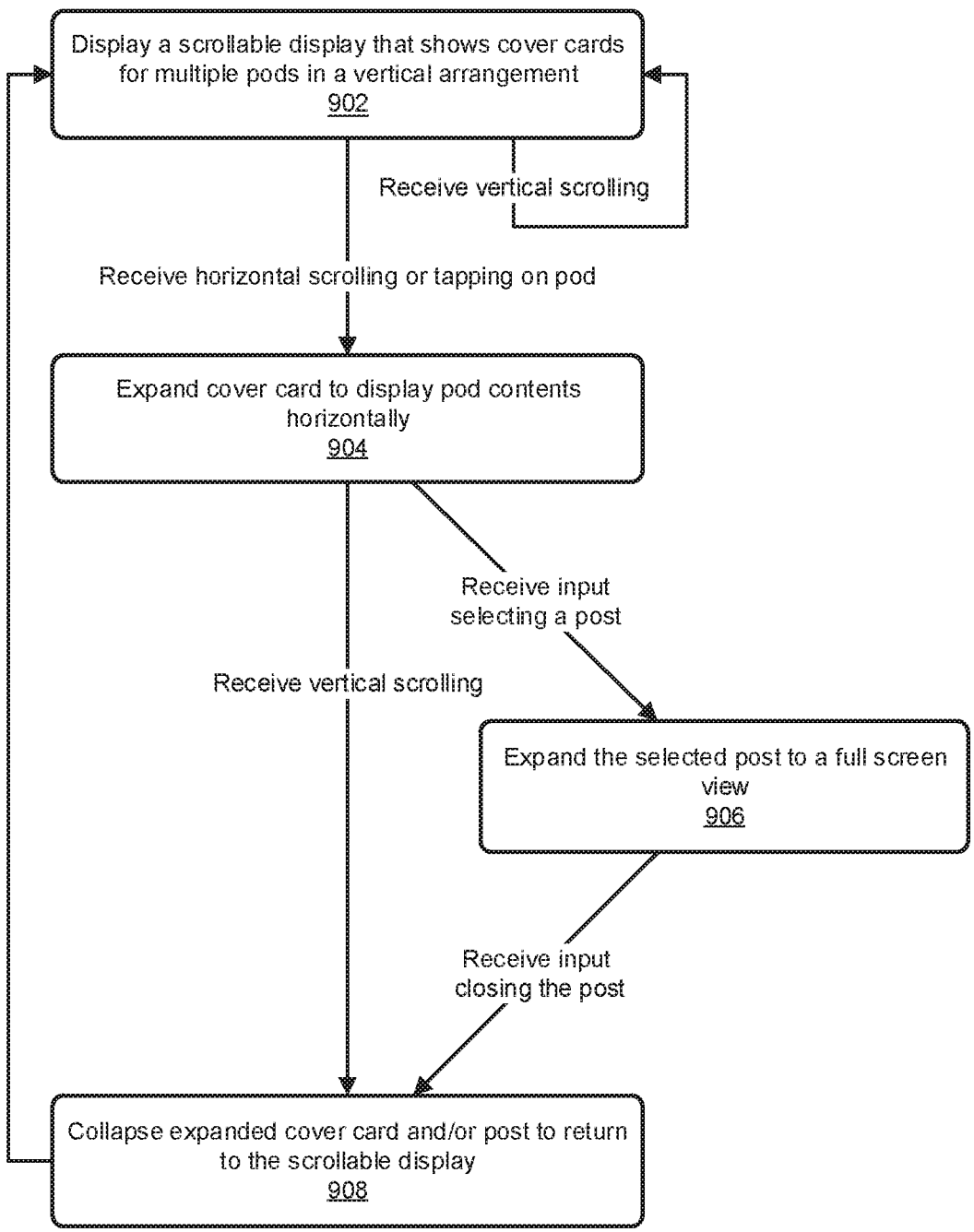
FIG. 9 is a flow diagram of an exemplary method for digital content navigation based on directional input.

As discussed above in connection with FIGS. 1-2, the systems described herein may enable a transition between different displays in response to receiving user input (e.g., between a pod cover digest display and a post display). The following discussion of FIG. 9 provides a description of an exemplary transition between different displays. FIG. 9 is a flow diagram of an exemplary method for digital content navigation that changes in response to receiving user input (e.g., by scrolling through content and/or by expanding content). In some examples, at step 902, the systems described herein may display a scrollable display that shows cover cards for multiple pods in a vertical arrangement (e.g., as illustrated in FIGS. 4 and 5).

In some examples, the default configuration for the scrollable display may include only cover cards (e.g., as illustrated in FIG. 5) and the systems described herein may receive user input that includes swiping and/or scrolling horizontally on a cover card and/or tapping, touching (e.g., via a touchscreen interface), or otherwise selecting a cover card in order to expand the contents of the cover card. In one embodiment, upon receiving this input, at step 904 in FIG. 9, the systems described herein may expand the cover card to display the pod contents horizontally (e.g., as illustrated in FIG. 6). In some embodiments, the systems described herein may only expand the cover card for the selected pod, not other pods. In one example, the expanded cover card may include a display of a horizontal row of representations of posts within the pod.

Figure 4:
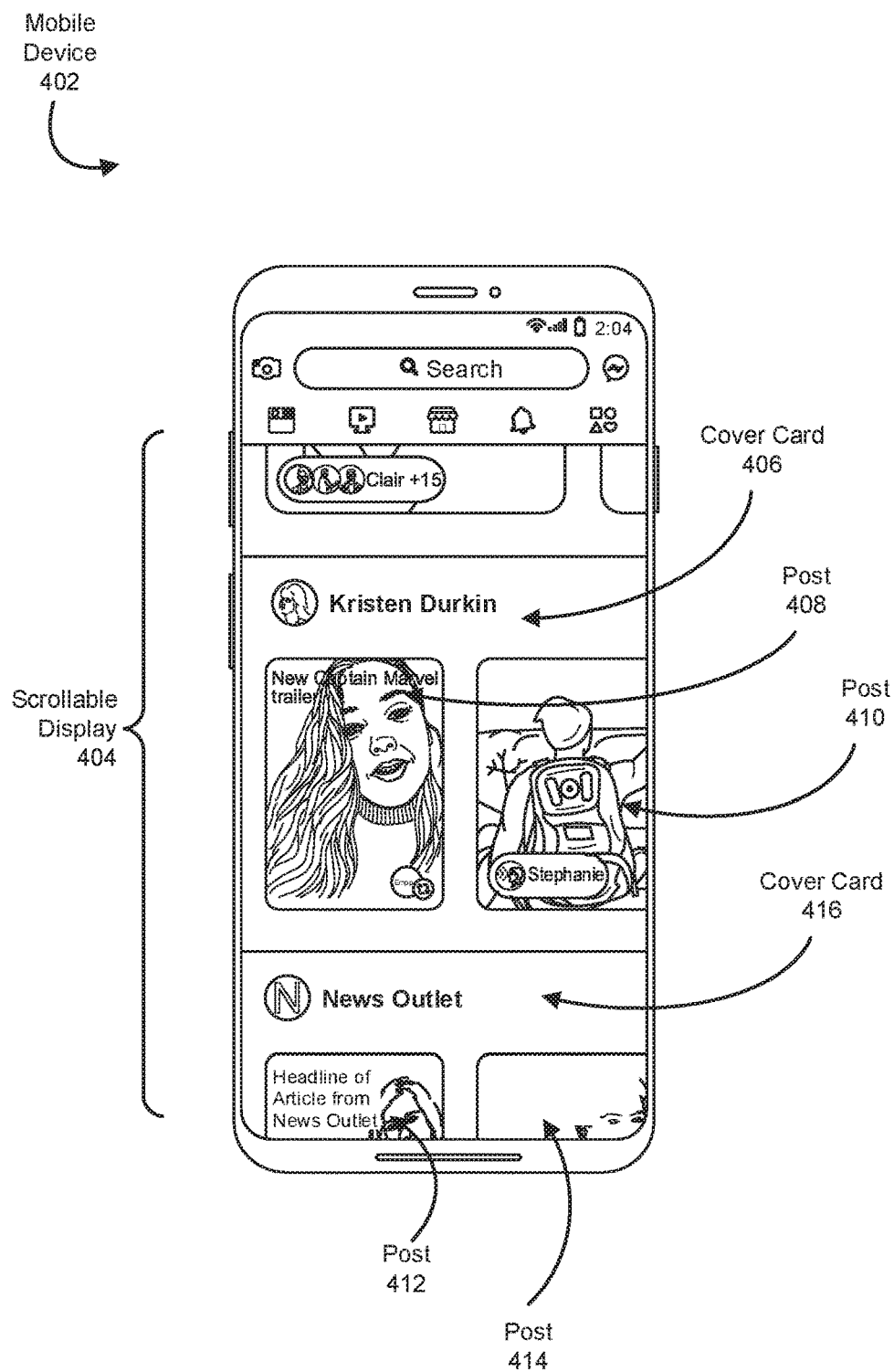
FIG. 4 is an illustration of an additional exemplary single-surface display for user content

In other examples (e.g., as illustrated in FIG. 4), the default configuration for the scrollable display may include horizontally arranged depictions of posts within the pod. In these examples, the systems described herein may expand the contents of the pod by displaying representations of additional posts within the pod (that are not immediately visible in the scrollable display due to limited space) in response to the user scrolling horizontally through the pod contents and/or selecting the cover card. In some embodiments, the systems described herein may also expand the horizontally arranged depictions of the posts vertically (e.g., enlarging the depictions of the posts to make them more visible to a user). Additionally or alternatively, the systems described herein may transition to a pod view of horizontally or vertically arranged posts in a pod in response to input selecting a cover card (e.g., as illustrated in FIG. 8).

In one example, the systems described herein may receive user input selecting (e.g., tapping, etc.) a post (e.g., from an expanded configuration and/or default configuration that displays posts). In response, at step 906 in FIG. 9, the systems described herein may expand the post to a full screen view (e.g., as illustrated in FIG. 7). In some embodiments, a full screen view of a single post may not display any other posts. In one example, the systems described herein may receive input closing the post (e.g., swiping the post away, tapping a close button, etc.). In response, the systems described herein may close the post and return to the expanded cover card view and/or the default scrollable display.

Additionally or alternatively, if the systems described herein did not receive input selecting a post and instead are displaying an expanded cover card within the scrollable display, the systems described herein may receive vertical swiping and/or scrolling input. In response, at step 908 in FIG. 9, the systems described herein may exit the full-screen view and/or collapse the expanded cover card and return to the default scrollable display.

As described above, the systems and methods described herein may enable a user to consume social media content in a single-surface display. In some embodiments, each post a user creates on a social networking platform may be automatically stored in a pod. Other users may then browse cover cards for these pods in a display that includes multiple pod cover cards. Selecting a pod cover card may expand the contents of the pod within the display or transition to a display of the pod's contents. Additionally, selecting a post may transition to a full-screen display of the post. In some embodiments, vertical swiping and/or scrolling input from any display may cause the systems described herein to scroll to cover cards for other pods and/or to transition back to a default scrollable display of pod cover cards.

EXAMPLE EMBODIMENTS

Example 1: A computer-implemented method for providing single-surface displays for user content may include (i) maintaining a user content pod for each user account within a group of user accounts maintained by a social networking platform, where each user content pod includes a digital container for one or more compositions posted to the social networking platform by its corresponding user account, (ii) generating a cover card for each user content pod, and (iii) providing, within a graphical user interface for interacting with posts made to the social networking platform, a scrollable display of vertically arranged selectable cover cards configured to (1) scroll vertically between cover cards of different user content pods in response to receiving vertical swiping input and (2) scroll horizontally between one or more posts of an individual user content pod in response to receiving horizontal swiping input.

Example 2: The computer-implemented method of example 1, where a default configuration of the scrollable display consists exclusively of cover cards without presenting additional content for any user content pod, beyond the user content pod's cover card, the default configuration is configured to transform into an expanded-pod configuration in response to receiving user input selecting a cover card from the scrollable display, and vertical scrolling is enabled in either the default configuration or the expanded-pod configuration of the scrollable display, but horizontal scrolling is only enabled in the expanded-pod configuration.

Example 3: The computer-implemented method of examples 1-2 may further include (i) receiving user input to the scrollable display selecting a cover card of a particular user content pod, (ii) in response to receiving the user input, transforming the default configuration of the scrollable display to an expanded-pod configuration in which a plurality of posts of the particular user content pod are displayed in a horizontal arrangement, (iii) receiving additional user input may include horizontal swiping input to the display of the posts of the particular user content pod, and (iv) horizontally scrolling between the posts of the particular user content pod in response to receiving the additional user input.

Example 4: The computer-implemented method of examples 1-3 may further include receiving further user input may include vertical swiping input to the display of the posts of the particular user content pod and, in response to receiving the further user input, transitioning from horizontally scrolling between the posts of the particular user content pod to vertically scrolling between the cover cards of different user content pods within the scrollable display.

Example 5: The computer-implemented method of examples 1-4, where receiving the user input selecting the cover card includes determining that a user has tapped the cover card via a touchscreen interface.

Example 6: The computer-implemented method of examples 1-5, where displaying the one or more posts of the particular user content pod includes displaying a scrollable summary display of the one or more posts.

Example 7: The computer-implemented method of examples 1-6, where providing the scrollable display of vertically arranged selectable cover cards includes providing a scrollable display of cover cards arranged in a grid that is two cover cards wide.

Example 8: The computer-implemented method of examples 1-7, where a default configuration of the scrollable display includes, alongside each cover card, a plurality of posts of the corresponding user content pod displayed in a horizontal arrangement.

Example 9: The computer-implemented method of examples 1-8 may further include transitioning from the scrollable display of vertically arranged selectable cover cards to a full-screen display of one post stored within the digital container of a particular user content pod.

Example 10: The computer-implemented method of examples 1-9, where the cover card for each user content pod includes at least one of (i) a depiction of one of the posts stored within the digital container of the user content pod, (ii) a username of the corresponding user account for the user content pod, or (iii) a user icon of the corresponding user account for the user content pod.

Example 11: The computer-implemented method of examples 1-10 may further include maintaining a plurality of group content pods that each include a digital container for one or more compositions posted to the social networking platform by a defined group of user accounts of the social networking platform and generating a group cover card for each group content pod, where the scrollable display of vertically arranged selectable cover cards further includes one or more group cover cards.

Example 12: The computer-implemented method of examples 1-11, where the appearance of group cover cards within the scrollable display of vertically arranged selectable cover cards systematically differs from the appearance of non-group cover cards within the scrollable display of vertically arranged selectable cover cards.

Example 13: The computer-implemented method of examples 1-12, where maintaining the user content pod for each user account may include automatically creating a user content pod for each user account and the method may further include (i) enabling users to create additional user content pods, in addition to the automatically created user content pods, and (ii) generating a cover card for each additional user content pod, and the scrollable display of vertically arranged selectable cover cards further includes one or more cover cards corresponding to an additional user content pod.

Example 14: A system for digital content navigation based on directional input may include at least one physical processor and physical memory including computer-executable instructions that, when executed by the physical processor, cause the physical processor to (i) maintain a user content pod for each user account within a group of user accounts maintained by a social networking platform, where each user content pod includes a digital container for one or more compositions posted to the social networking platform by its corresponding user account, (ii) generate a cover card for each user content pod, and (iii) provide, within a graphical user interface for interacting with posts made to the social networking platform, a scrollable display of vertically arranged selectable cover cards configured to (1) scroll vertically between cover cards of different user content pods in response to receiving vertical swiping input and (2) scroll horizontally between one or more posts of an individual user content pod in response to receiving horizontal swiping input.

Example 15: The system of example 14, where (i) a default configuration of the scrollable display does not present additional content for any user content pod, beyond the user content pod's cover card, (ii) the default configuration is configured to transform into an expanded-pod configuration in response to receiving user input selecting a cover card from the scrollable display, and (iii) vertical scrolling is enabled in either the default configuration or the expanded-pod configuration of the scrollable display, but horizontal scrolling is only enabled in the expanded-pod configuration.

Example 16: The system of examples 15-16, where the computer-executable instructions cause the physical processor to (i) receive user input to the scrollable display selecting a cover card of a particular user content pod, (ii) in response to receiving the user input, transform the default configuration of the scrollable display to an expanded-pod configuration in which a plurality of posts of the particular user content pod are displayed in a horizontal arrangement, (iii) receive additional user input may include horizontal swiping input to the display of the posts of the particular user content pod, and (iv) horizontally scroll between the posts of the particular user content pod in response to receiving the additional user input.

Example 17: The system of examples 15-17, where the computer-executable instructions cause the physical processor to receive further user input may include vertical swiping input to the display of the posts of the particular user content pod, and in response to receiving the further user input, transition from horizontally scrolling between the posts of the particular user content pod to vertically scrolling between the cover cards of different user content pods within the scrollable display.

Example 18: The system of examples 15-17, where receiving the user input selecting the cover card includes determining that a user has tapped the cover card via a touchscreen interface.

Example 19: The system of examples 15-18, where providing the scrollable display of vertically arranged selectable cover cards includes providing a scrollable display of cover cards arranged in a grid that is two cover cards wide.

Example 20: A non-transitory computer-readable medium may include one or more computer-readable instructions that, when executed by at least one processor of a computing device, cause the computing device to (i) maintain a user content pod for each user account within a group of user accounts maintained by a social networking platform, where each user content pod includes a digital container for one or more compositions posted to the social networking platform by its corresponding user account, (ii) generate a cover card for each user content pod, and (iii) provide, within a graphical user interface for interacting with posts made to the social networking platform, a scrollable display of vertically arranged selectable cover cards configured to (1) scroll vertically between cover cards of different user content pods in response to receiving vertical swiping input and (2) scroll horizontally between one or more posts of an individual user content pod in response to receiving horizontal swiping input.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive image data to be transformed, transform the image data into a data structure that stores user characteristic data, output a result of the transformation to select a customized interactive ice breaker widget relevant to the user, use the result of the transformation to present the widget to the user, and store the result of the transformation to create a record of the presented widget. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:
1. A computer-implemented method comprising:
maintaining a user content pod for each user account within a plurality of user accounts maintained by a social networking platform, wherein (1) each user content pod comprises a digital container for ephemeral posts posted to the social networking platform by its corresponding user account and (2) each ephemeral post is set to automatically expire after a certain amount of time;
additionally maintaining a plurality of group content pods that each comprise a digital container for one or more ephemeral posts posted to the social networking platform by a defined group of user accounts of the social networking platform;

generating a cover card for each user content pod and for each group content pod, wherein the cover card for each user content pod is configured to include an image from a single ephemeral post of the user content pod and the cover card for each group content pod is configured to include a depiction of multiple posts; and providing, within a graphical user interface for interacting with ephemeral posts posted to the social networking platform, a scrollable display, comprising a plurality of vertically arranged selectable cover cards within a grid, wherein (1) cover cards for user content pods are arranged within the grid in a two-cover-cards-wide configuration while (2) cover cards for group content pods are arranged within the grid in a one-cover-card-wide configuration.

2. The computer-implemented method of claim 1, wherein cover cards for user content pods within the scrollable display are configured to transform into an expanded-pod configuration in response to being selected from the scrollable display via user input.

3. The computer-implemented method of claim 2, further comprising:
receiving user input to the scrollable display selecting a cover card of a particular user content pod;
in response to receiving the user input, transforming a default configuration of the scrollable display to an expanded-pod configuration in which a plurality of ephemeral posts of the particular user content pod are displayed in a horizontal arrangement;
receiving additional user input comprising horizontal swiping input to the display of the ephemeral posts of the particular user content pod; and
horizontally scrolling between the ephemeral posts of the particular user content pod in response to receiving the additional user input.

4. The computer-implemented method of claim 3, further comprising:
receiving further user input comprising vertical swiping input to the display of the ephemeral posts of the particular user content pod; and
in response to receiving the further user input, transitioning from horizontally scrolling between the ephemeral posts of the particular user content pod to vertically scrolling between the cover cards of different user content pods and group content pods within the scrollable display.

5. The computer-implemented method of claim 3, wherein receiving the user input selecting the cover card comprises determining that a user has tapped the cover card via a touchscreen interface.

6. The computer-implemented method of claim 3, wherein displaying the one or more ephemeral posts of the particular user content pod comprises displaying a scrollable summary display of the one or more ephemeral posts.

7. The computer-implemented method of claim 1, further comprising transitioning from the scrollable display of vertically arranged selectable cover cards to a full-screen display of one ephemeral post stored within the digital container of a particular user content pod.

8. The computer-implemented method of claim 1, wherein the cover card for each user content pod comprises, in addition to an image from an ephemeral post of the user content pod, at least one of:
a username of the corresponding user account for the user content pod; or
a user icon of the corresponding user account for the user content pod.

9. The computer-implemented method of claim 1, wherein the cover card for each group content pod is configured to comprise, in addition to the depiction of multiple posts, at least one of:
a group name;
a group icon;
an indication of a number of members to the group content pod; or
an indication of a number of posts in the group content pod.

10. The computer-implemented method of claim 1, wherein:
maintaining the user content pod for each user account comprising automatically creating a user content pod for each user account;
the method further comprises:
enabling users to create additional user content pods, in addition to the automatically created user content pods; and
generating a cover card for each additional user content pod; and
the scrollable display of vertically arranged selectable cover cards further comprises one or more cover cards corresponding to an additional user content pod.

11. A system comprising:
at least one physical processor;
physical memory comprising computer-executable instructions that, when executed by the physical processor, cause the physical processor to:
maintain a user content pod for each user account of a social networking platform within a plurality of user accounts maintained by a social networking platform, wherein (1) each user content pod comprises a digital container for ephemeral posts posted to the social networking platform by its corresponding user account and (2) each ephemeral post is set to automatically expire after a certain amount of time;
additionally maintain a plurality of group content pods that each comprise a digital container for one or more ephemeral posts posted to the social networking platform by a defined group of user accounts of the social networking platform;
generate a cover card for each user content pod and for each group content pod, wherein the cover card for each user content pod is configured to include an image from a single ephemeral post of the user content pod and the cover card for each group content pod is configured to include a depiction of multiple posts; and
provide, within a graphical user interface for interacting with ephemeral posts posted to the social networking platform, a scrollable display, comprising a plurality of vertically arranged selectable cover cards within a grid, wherein (1) cover cards for user content pods are arranged within the grid in a two-cover-cards-wide configuration while (2) cover cards for group content pods are arranged within the grid in a one-cover-card-wide configuration.

12. The system of claim 11, wherein cover cards for user content pods within the scrollable display are configured to transform into an expanded-pod configuration in response to being selected from the scrollable display via user input.

13. The system of claim 12, wherein the computer-executable instructions cause the physical processor to:
receive user input to the scrollable display selecting a cover card of a particular user content pod;

in response to receiving the user input, transform a default configuration of the scrollable display to an expanded-pod configuration in which a plurality of ephemeral posts of the particular user content pod are displayed in a horizontal arrangement;

receive additional user input comprising horizontal swiping input to the display of the ephemeral posts of the particular user content pod; and horizontally scroll between the ephemeral posts of the particular user content pod in response to receiving the additional user input.

14. The system of claim 13, wherein the computer-executable instructions cause the physical processor to:

receive further user input comprising vertical swiping input to the display of the ephemeral posts of the particular user content pod; and in response to receiving the further user input, transition from horizontally scrolling between the ephemeral posts of the particular user content pod to vertically scrolling between the cover cards of different user content pods and group content pods within the scrollable display.

15. The system of claim 13, wherein receiving the user input selecting the cover card comprises determining that a user has tapped the cover card via a touchscreen interface.

16. The system of claim 12, wherein the cover card for each user content pod comprises, in addition to an image from an ephemeral post of the user content pod, at least one of:

a username of the corresponding user account for the user content pod; or a user icon of the corresponding user account for the user content pod.

17. The system of claim 11, wherein the cover card for each group content pod is configured to comprise, in addition to the depiction of multiple posts, at least one of:

a group name;

a group icon;

an indication of a number of members to the group content pod; or an indication of a number of posts in the group content pod.

18. A non-transitory computer-readable medium comprising one or more computer-readable instructions that, when executed by at least one processor of a computing device, cause the computing device to:

maintain a user content pod for each user account of a social networking platform within a plurality of user accounts maintained by a social networking platform, wherein (1) each user content pod comprises a digital container for ephemeral posts posted to the social networking platform by its corresponding user account and (2) each ephemeral post is set to automatically expire after a certain amount of time;

additionally maintain a plurality of group content pods that each comprise a digital container for one or more ephemeral posts posted to the social networking platform by a defined group of user accounts of the social networking platform;

generate a cover card for each user content pod and for each group content pod, wherein the cover card for each user content pod is configured to include an image from a single ephemeral post of the user content pod and the cover card for each group content pod is configured to include a depiction of multiple posts; and provide, within a graphical user interface for interacting with ephemeral posts posted to the social networking platform, a scrollable display, comprising a plurality of vertically arranged selectable cover cards within a grid, wherein (1) cover cards for user content pods are arranged within the grid in a two-cover-cards-wide configuration while (2) cover cards for group content pods are arranged within the grid in a one-cover-card-wide configuration.

19. The non-transitory computer-readable medium of claim 18, wherein the cover card for each user content pod comprises, in addition to an image from an ephemeral post of the user content pod, at least one of:

a username of the corresponding user account for the user content pod; or a user icon of the corresponding user account for the user content pod.

20. The non-transitory computer-readable medium of claim 18, wherein the cover card for each group content pod is configured to comprise, in addition to the depiction of multiple posts, at least one of:

a group name;

a group icon;

an indication of a number of members to the group content pod; or an indication of a number of posts in the group content pod.

* * * * *